United States Patent
Syed et al.

(10) Patent No.: US 9,836,332 B2
(45) Date of Patent: Dec. 5, 2017

(54) SOFTWARE DEFINED SAAS PLATFORM

(71) Applicant: Corent Technology, Inc., Aliso Viejo, CA (US)

(72) Inventors: Shafiullah Syed, Saratoga, CA (US); Feyzi Fatehi, Aliso Viejo, CA (US); Sethuraman Venkataraman, Thiruninravur (IN); Jeya Anantha Prabhu, Chennai (IN)

(73) Assignee: Corent Technology, Inc., Aliso Viejo, CA (US)

( * ) Notice: Subject to any disclaimer, the term of this patent is extended or adjusted under 35 U.S.C. 154(b) by 0 days.

(21) Appl. No.: 14/815,323

(22) Filed: Jul. 31, 2015

(65) Prior Publication Data

US 2016/0034277 A1 Feb. 4, 2016

Related U.S. Application Data

(60) Provisional application No. 62/031,495, filed on Jul. 31, 2014.

(51) Int. Cl.
*G06F 9/44* (2006.01)
*G06F 9/45* (2006.01)
(Continued)

(52) U.S. Cl.
CPC ............... *G06F 9/541* (2013.01); *G06F 8/76* (2013.01); *G06F 9/5072* (2013.01); *G06F 2209/542* (2013.01)

(58) Field of Classification Search
CPC ............... G06F 8/76; G06F 8/20–8/40; G06F 9/45558; G06F 8/60; G06F 9/541;
(Continued)

(56) References Cited

U.S. PATENT DOCUMENTS 8,533,687 B1 * 9/2013 Greifeneder ........ G06F 11/3495
717/127
9,043,458 B2 5/2015 Balaji et al.
(Continued)

FOREIGN PATENT DOCUMENTS

WO 2013055601 4/2013
WO 2014201238 12/2014

OTHER PUBLICATIONS

Corent, Multi-Tenant Server—Datasheet, https://www.corenttech.com/images/downloads/mts_datasheet.pdf, 2012, pp. 1-4.*
(Continued)

*Primary Examiner* — Thuy Dao
*Assistant Examiner* — Mongbao Nguyen

(57) ABSTRACT

A system that transforms non-SaaS (non Software as a Service) applications into tenant-aware SaaS (Software as a Service) applications is disclosed, which analyzes the non SaaS applications to determine which intercepts to external libraries need to be translated into SaaS intercepts that utilize SaaS tenancy services, SaaS operations services, and/or SaaS business services. The system transforms the non-SaaS applications into SaaS applications by providing intercept handlers that call SaaS services on demand when the transformed SaaS application throws a transformed SaaS interrupt.

7 Claims, 7 Drawing Sheets

(51) Int. Cl.
  *G06F 9/54* (2006.01)
  *G06F 9/50* (2006.01)

(58) Field of Classification Search
  CPC ............ G06F 9/5072; G06F 2209/542; H04L 67/10; H04L 63/10–63/107
  See application file for complete search history.

(56) References Cited

U.S. PATENT DOCUMENTS

| | | | |
|---|---|---|---|
| 9,176,773 B2* | 11/2015 | Fries | G06F 9/4856 |
| 2002/0019884 A1* | 2/2002 | Gungabeesoon | G06F 9/541 |
| | | | 719/310 |
| 2012/0072581 A1* | 3/2012 | Tung | G06F 9/5072 |
| | | | 709/224 |
| 2012/0185913 A1* | 7/2012 | Martinez | G06F 9/455 |
| | | | 726/1 |
| 2012/0259909 A1* | 10/2012 | Bachelor | G06N 3/02 |
| | | | 709/201 |
| 2013/0007216 A1* | 1/2013 | Fries | G06F 9/4856 |
| | | | 709/218 |
| 2013/0060945 A1* | 3/2013 | Allam | G06F 9/5072 |
| | | | 709/226 |
| 2013/0097204 A1* | 4/2013 | Venkataraman | G06F 17/3056 |
| | | | 707/784 |
| 2013/0159977 A1* | 6/2013 | Crosetto | G06F 11/3636 |
| | | | 717/128 |
| 2013/0211555 A1* | 8/2013 | Lawson | G05B 19/4185 |
| | | | 700/28 |
| 2014/0082166 A1* | 3/2014 | Robinson | G06F 9/5072 |
| | | | 709/223 |
| 2014/0115161 A1* | 4/2014 | Agarwal | G06F 9/45558 |
| | | | 709/226 |
| 2014/0156813 A1* | 6/2014 | Zheng | H04L 67/16 |
| | | | 709/220 |
| 2014/0181306 A1* | 6/2014 | Kothamasu | H04L 41/5077 |
| | | | 709/226 |
| 2014/0281708 A1* | 9/2014 | Adam | G06F 11/1443 |
| | | | 714/18 |
| 2014/0282439 A1* | 9/2014 | Kannan | G06F 8/76 |
| | | | 717/140 |
| 2014/0282456 A1* | 9/2014 | Drost | G06F 8/76 |
| | | | 717/158 |
| 2014/0344395 A1* | 11/2014 | Alexander | H04L 67/34 |
| | | | 709/217 |
| 2015/0020059 A1* | 1/2015 | Davis | G06F 8/60 |
| | | | 717/171 |
| 2015/0058459 A1* | 2/2015 | Amendjian | H04L 41/5058 |
| | | | 709/223 |
| 2015/0281356 A1* | 10/2015 | Maturana | H04L 67/1097 |
| | | | 709/217 |
| 2015/0295731 A1* | 10/2015 | Bagepalli | H04L 12/6418 |
| | | | 370/401 |
| 2015/0324215 A1* | 11/2015 | Borthakur | G06F 9/45558 |
| | | | 718/1 |

OTHER PUBLICATIONS

Seroter, SaaS Your App: Building for Software as a Service (Part I), https://www.ctl.io/blog/post/saas-your-app-part-i/, 2012, pp. 1-14.*
Dave, Cloud, Software Development for SaaS is Different, http://cloudstrategies.biz/why-software-development-for-saas-is-different/, 2012, pp. 1-7.*

* cited by examiner

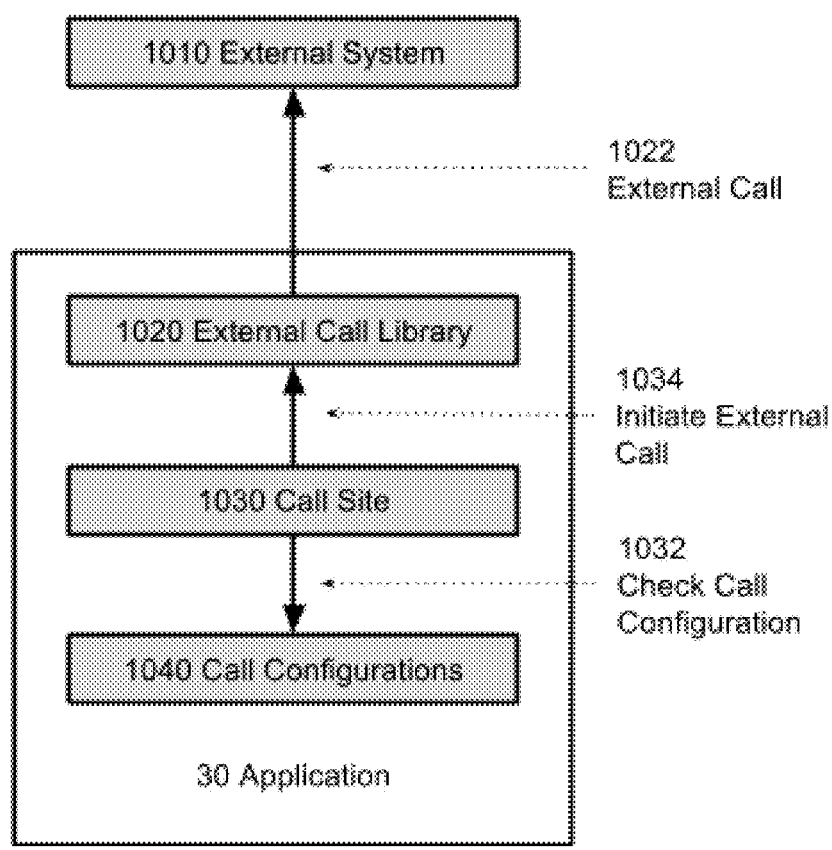
Fig. 5a. Before Transformation

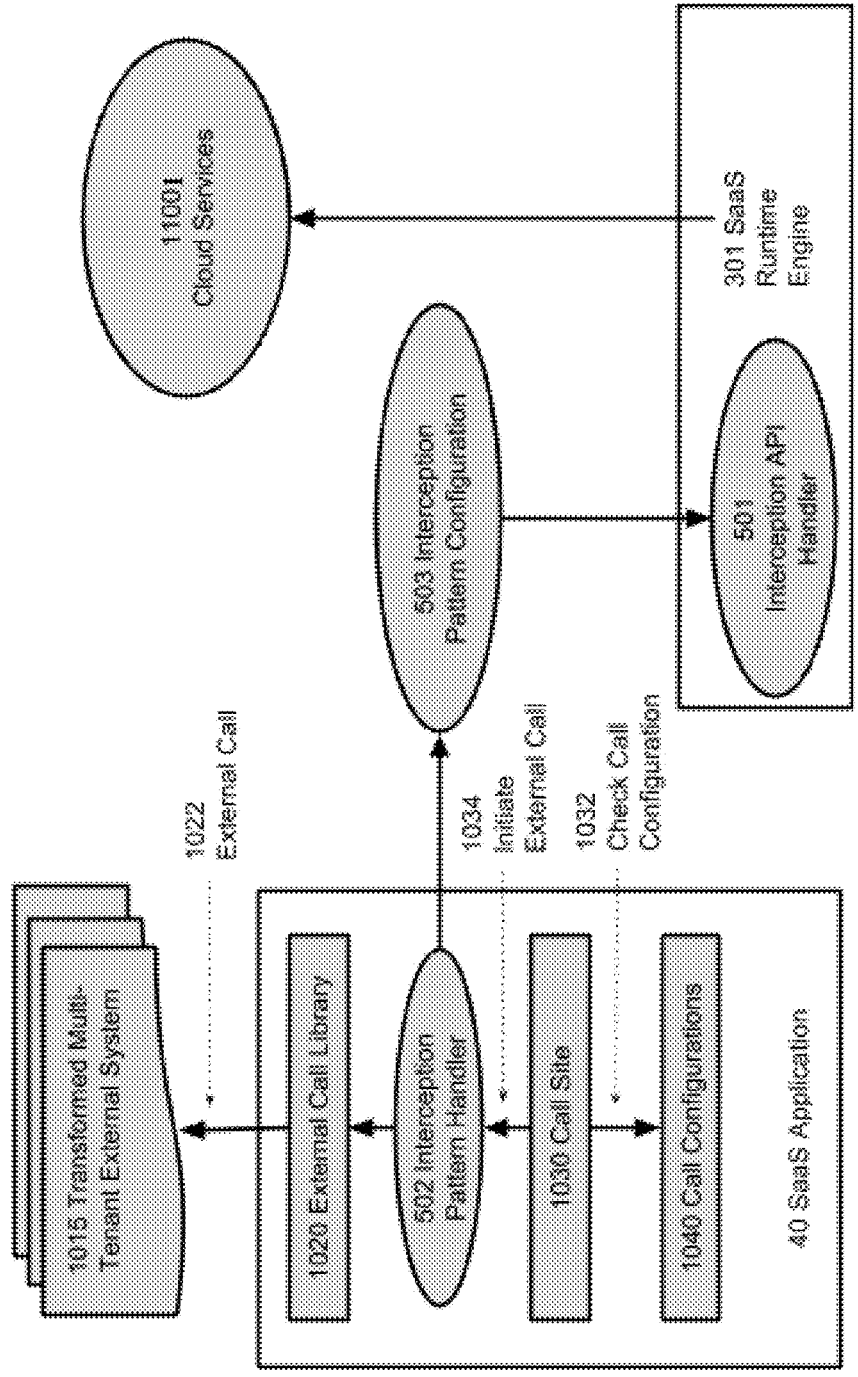
Fig. 5b. After Transformation and Inside SaaS Environment

Fig. 5c. After Transformation but Outside SaaS Environment
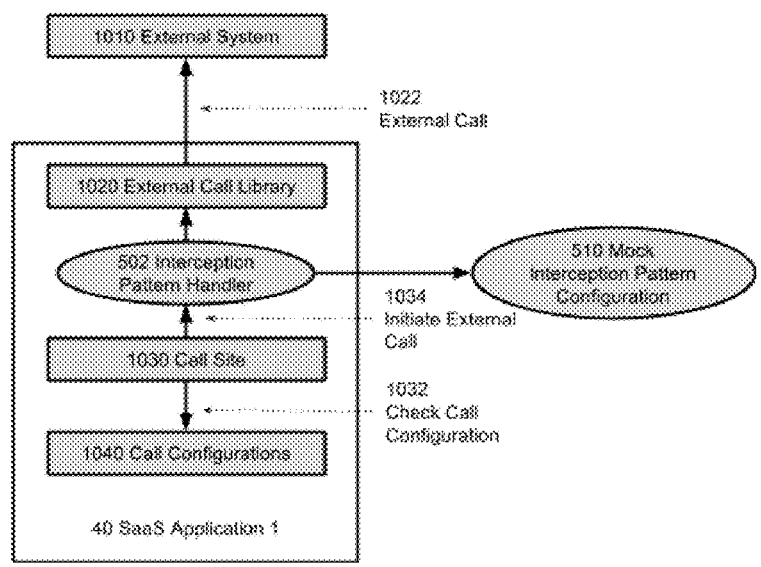
Fig. 6. Operations Service Engine
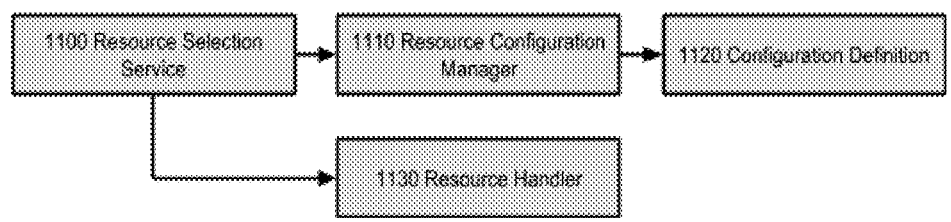

SOFTWARE DEFINED SAAS PLATFORM

This application claims the benefit of priority to U.S. provisional application 62/031,495 filed on Jul. 31, 2014. This and all other extrinsic references referenced herein are incorporated by reference in their entirety.

FIELD OF THE INVENTION

The field of the invention is software applications and services.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Computer environments have evolved from localized single user systems, to multi-user systems accessible by geographically distributed users. More recently, as cloud resources have become available, there has been a push to migrate one or more aspects (computer power, memory, storage, etc) of what were previously localized systems into the cloud. This can be done for many reasons, including efficient allocation of resources, cost-effective scalability, improved reliability, improved security, and greater accessibility.

There are numerous issues that arise in executing such migrations, including especially time and cost. For example, many applications are not well suited to a particular cloud environment because (a) cloud environments and their resources are available in a wide variety of configurations and may not pair well with the application's requirements, (b) legacy applications may fail to take advantage of the additional resources offered by a cloud environment and/or (c) applications run inefficiently in a cloud. Before migrating local software applications into a cloud environment, it is helpful to match and compare a local software application's hardware, software, network, and other application environment resources with the resources of any cloud environments considered for migration. The matching and comparing reveals compatibility, costs, and other software migration factors that can serve as a basis for the selection of a proper cloud environment or environments.

Thus, there is still a need for systems and methods that efficiently adapt legacy software applications so they may take advantage of the resources and benefits of a cloud environment, including migrating non-tenant aware software applications into applications that can be operated in tenant applications in a SaaS (Software as a Service) environment. One particular need is to modify and configure non-SaaS applications to provide SaaS capabilities, including tenancy services, operations services, and business services.

SUMMARY OF THE INVENTION

The inventive subject matter provides apparatus, systems, and methods in which a non-SaaS capable software application is automatically enabled to operate as a SaaS application by a scanning engine, a compatibility engine, and a runtime engine.

The scanning engine is preferably configured to identify characteristics of software applications related to SaaS (Software as a Service) application capabilities. Such characteristics include, for example, tenancy services, operations services, and business services. Preferably the scanning engine identifies whether the scanned software application has application characteristics and/or services that are not capable of SaaS functionality. Thus, for a given list of SaaS application capabilities and/or services, the scanning engine could be configured to determine whether or not the scanned software application has each element of the list.

The compatibility engine is preferably configured to replicate the software application and use information from the scanning engine to add an interface between the non-SaaS capable application modules and the SaaS runtime engine. The runtime engine is preferably configured to connect to and provide the operation of SaaS functionality and services available in a cloud environment. SaaS functionality and services preferably include, for example, tenancy services, operations services, and/or business services.

Of particular interest are systems and methods to automatically make a non-SaaS capable application capable of operating in a cloud environment, without altering or disturbing the core components of the application. By preventing alteration or disruption of the core components, legacy applications responsible for critical business operations can reliable and safely take full advantage of cloud capabilities without risking functionality.

Viewed from another perspective, the inventive subject matter provides apparatus, systems and methods that matches local application requirements with cloud resources, transforms any SaaS service deficient application into SaaS capable applications, and non-tenant aware applications into at least appearance of tenant-aware applications, maps the applications efficiently to the cloud resources, and monitors and meters users consumption of cloud resources and SaaS services.

In order to assess the compatibility, benefits, and other software migration factors for migrating one or more locally operated software applications to one or more cloud environments, it is helpful if the modules of each application are mapped onto appropriate cloud environment resources. In order to provide a comprehensive analysis, it can be advantageous to generate as many maps of the application modules as possible, and then apply each module map to the cloud environment resources in as many variations as possible. Once a full list of possible configurations to map the application modules to the cloud environment has been generated, the user can select the most desirable configuration based time, speed, power, cost, or other performance factors.

Once a cloud environment or multiple environments have been selected for a single or multiple local software applications, each software application is preferably transformed to operate in each home cloud environment to facilitate the application (a) running efficiently in the cloud environment, and/or (b) taking advantage of additional resources offered by a cloud environment. Software applications can be individually re-written to resolve those issues, but it is often desirable to provide an automated process for transforming existing software applications (which might be locally based) to operate efficiently in a cloud environment. An automated process for transforming a locally operated software application into a cloud operated software application reduces the delay and cost required to migrate a local application into the cloud.

In one class of preferred embodiments, the inventive subject matter of the present invention relates to a system automated to insert SaaS services into a non-SaaS application (or a replicated version of the non-SaaS application), allowing it to be delivered as SaaS to a tenant. This can be accomplished by analyzing the non-SaaS application to determine which application modules lack desired SaaS capable services, transforming the modules to include an interface for the desired SaaS service engines in a cloud environment, and ultimately interfacing the inserted SaaS services with the SaaS service engines in the cloud. The automated system may be performed over as few or as many software applications as possible or desired by a user, and may be used to insert as few or as many SaaS services as possible or desired by a user. In a preferred embodiment, the desired SaaS services include tenancy, operations, and business services.

Once one or more locally operated applications have been migrated into the cloud and configured to operate in the cloud environment, most or even all operations or workloads engaged by the application will likely be performed by the cloud environment resources. In order to efficiently utilize cloud resources, it is helpful to first divide the application's workloads into related groups or partitions, and then assign each partition to a cloud resource. The assignment of partitions to cloud resources can be based on time, speed, power, cost, or other performance factors, that are most desirable for the user.

In interpreting descriptions in this Specification, groupings of alternative elements or embodiments of the inventive subject matter are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 5a is a schematic showing a non-tenant aware application before it has been transformed into a tenant-aware SaaS application.

FIG. 5b is a schematic showing the application of FIG. 5a transformed into a tenant-aware application installed in a SaaS environment.

FIG. 5c is a schematic showing the application of FIG. 5a transformed into a tenant-aware application installed outside an SaaS environment.

FIG. 6 is a schematic of an exemplary operations service engine

DETAILED DESCRIPTION

Figure 1:
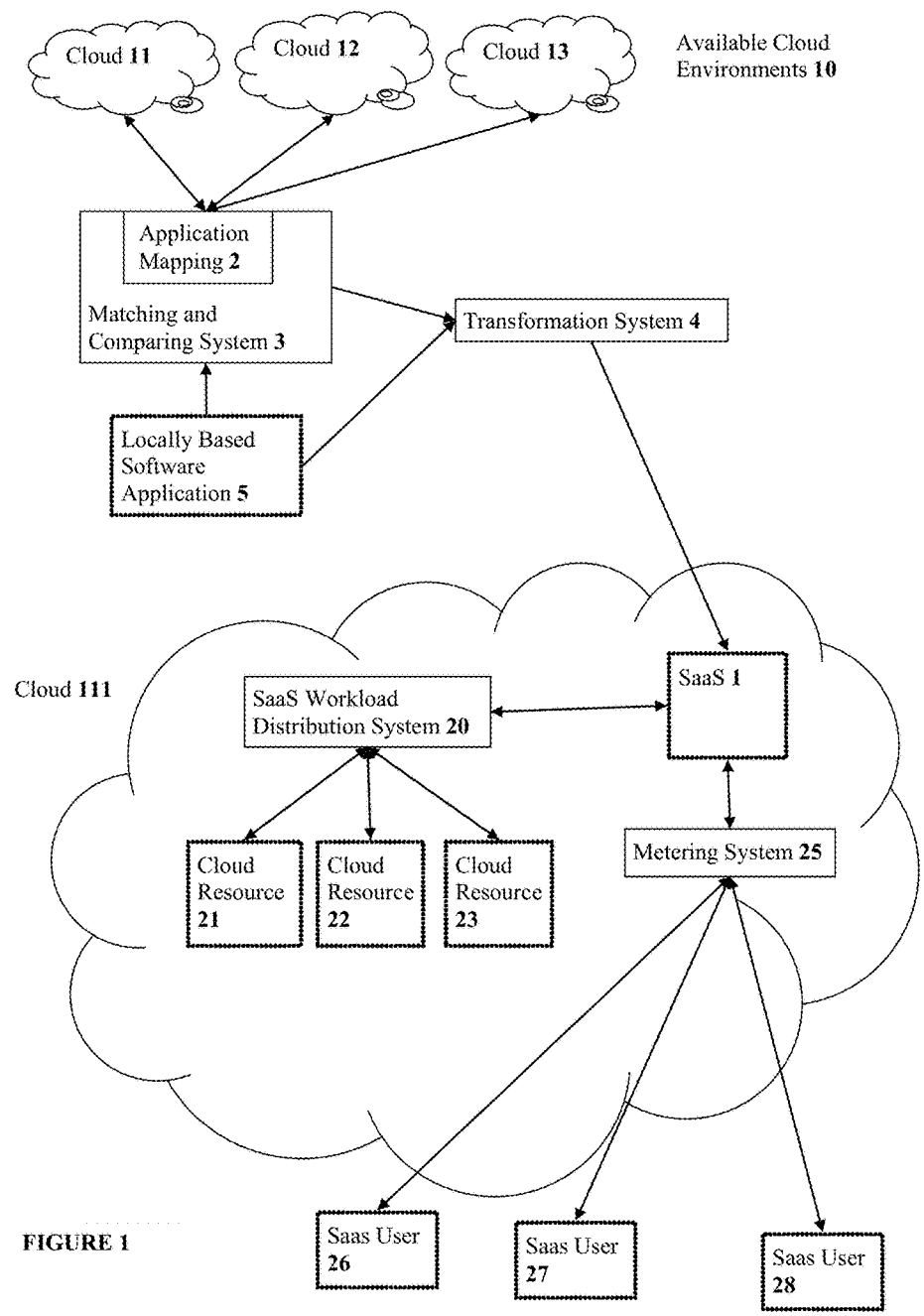
FIG. 1 is a schematic of the migration of a locally based software application to a cloud environment.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Computer systems that are functionally coupled to one another are coupled via an electronic network that allows one computer device to transmit data to another coupled computer device.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

In one embodiment as depicted in FIG. 1, a locally based software application 5 is analyzed by matching and comparing system 3 for migration to available cloud environments 10 comprised of clouds 11, 12, and 13. In order to select a desirable cloud, matching and comparing system 3 scans both software application 5 and clouds 11, 12, and 13, to determine the relevant resource environments and modules. The application mapping system 2 could then map the application modules of software application 5 to on or more of the cloud resources of clouds 11, 12, and 13. Reports from matching and comparing system 3 and/or application mapping system 2 could be provided the user with information that can be used to select a desirable cloud environment from among clouds 11, 12, and 13, or any other available cloud environments.

As used herein, the term "locally based application" means an application that is not currently operating with or within a cloud based environment. Under this definition, an instance of an application is locally based if that instance is not currently operating with or within a cloud based environment, even though another instance of the same or similar software is currently operating with or within a cloud based environment. Also, where an application has both locally based and cloud based modules, the application is considered to be part locally based and part cloud based.

As used herein, the term "cloud based application" means an application that is currently operating at least in part, with or within a cloud based environment.

Available clouds and cloud environments are contemplated to include one or more individual clouds, one or more clouds that overlap among or between each other, and a mixture of one or more individual and overlapping clouds.

Although FIG. 1 depicts only one locally based application 5, any realistic number of locally based applications could be involved. Likewise, although FIG. 1 depicts only three available cloud environments, the involvement of as many or as few cloud environments as realistically possible. Thus, FIG. 1 should be interpreted generically as depicting systems and methods in which one or more locally based software applications, collectively having a plurality of software modules, is matched to one or more available clouds.

Desirability of any particular clouds depends on whatever paradigm is deemed relevant for/by the human or machine user. For example, desirability could be based on a weighing of performance factors (e.g., processor availability and/or capacity, memory availability and/or capacity, power consumption) and/or non-performance factors (e.g., cost, time spent).

Scanning can be accomplished in any suitable manner. For example, scanning of the software application can involve identification of the different modules, and identification of the resources utilized by the various modules, including hardware, libraries and other software, and network resource configurations. Scanning of the cloud or clouds approaches the situation from the opposite perspective by identifying what hardware, software, and network resource configurations are available.

Application mapping compares and groups the requirements of the application modules to the cloud resources. This can be accomplished by assembling one or even a few permutations of maps, but preferably this is accomplished by investigating a large number of permutations of maps. The system then compares the performance and non-performance factors associated with many, or even all, of the various permutations investigated.

Reports can be generated for the user from the comparing and mapping systems. Reports can advantageously provide rankings of the various permutations, recommendations, etc, and in some instances could provide warning of insufficient information or failure of scanning, mapping, matching or comparing algorithms. Reports can be presented in any suitable format, in charts, tables, in printed format, dynamic or static GUIs, etc.

Continuing on with the description of the embodiment depicted in FIG. 1, the human or machine user could select a cloud environment from the available cloud environments as the destination for the migration of software application 10, here cloud 11. SaaS transformer 4 then analyzes the application modules of software application 10, and transforms one or more of the modules and/or application environment contexts of the modules to interface with tenancy, operations, and/or business engines in the cloud environment 11. In some embodiments this creates a copy of locally based software application 10 to be operated as SaaS 1 in cloud 111.

In order to transform locally based software applications into SaaS capable applications, it is helpful to analyze the locally based software application, preferably including the application environment context. This analysis can be accomplished in any suitable manner. For example, analysis of the application can involve identifying from the one or more modules within the application which module or modules should be transformed to offer tenancy, operations, and/or business services.

The transformation of locally based software applications into SaaS capable applications can also be accomplished in any suitable manner. For example, information identifying which application modules should be transformed to offer tenancy, operations, and business services in the cloud can be used to add tags, agents, and application programming interface ("API") calls to those services, making the locally based application into a SaaS capable application.

In some contemplated instances the transformation involves modification of the application, and in other contemplated instances transformation involves modification of the application environment context. For example, regarding transformation of a non-tenant aware application to an application that operates with multiple tenants, one could modify the application according to teachings of WO2008042984 (Hofhansl) and US20100005055 (An), or modify the application environment context according to teachings of U.S. Pat. No. 8,326,876 (Venkatraman) or US2010/0005443 (Kwok). Co-owned U.S. Pat. No. 8,326,876 (Venkataraman) also discloses multi-tenant agile database connectors that could be used to transform a locally-based application into a multi-tenant application system.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The interfacing between the SaaS capable application and the tenancy, operations, and business capabilities of the cloud environment can be accomplished in any suitable manner. For example, links can be created between the SaaS capable application modules and the tenancy, operations, and business capabilities of the cloud environment. In a subset of this embodiment, the links can be managed by a SaaS runtime engine in the cloud. In a further subset of this embodiment, the tenancy, business, and operations services in the cloud can be delivered to the SaaS capable application via at least one service engine, each of which can operate through the SaaS runtime engine.

In FIG. 1 the SaaS workload distribution system 20 analyzes the workloads of SaaS 1, groups interrelated workloads together in partitions, and can assign the partitions to be executed by cloud resources from among, for example, cloud resources 21, 22, and 23.

The analysis of SaaS capable applications to detect workloads can be accomplished in any suitable manner. In one embodiment of the inventive subject matter, a scan of software applications identifies various workloads and other software components in the applications, as well as the dependencies, interdependencies, independencies, and other relationships between and among various software components and the environment in which the application operates, including application servers, databases, operating systems, hardware configurations, external software, hardware interfaces, and other aspects of the application environment.

As used herein, the term "workload" means an independently executable software sub-unit on a computing hardware. A workload can therefore be comprised of one or more modules, and a workload can use one or more other workloads in order to function as an independent software system. Modules comprising a workload can be independently executed on any computation instance, element, unit, or other computer resource.

The division of workloads into partitions can be performed in any suitable manner. For example, a human or machine user can set parameters to govern the mapping and/or assignment of software application workloads into partitions. The parameters for partitioning can be based on efficient use of cloud resources, low cost operation of the application, heightened performance of the application, or other user desired results. In one embodiment of the inventive subject matter, workloads are grouped into partitions based on module characteristics and relations between and among various workloads and aspects of the application environment. In addition, the workloads of a single application can be mapped and/or assigned to multiple partitions or groups of partitions, representing as many or as few partition permutations as is possible or desired by the user. Further, the workloads of more than one software application can be mapped and/or assigned into multiple partitions or groups of partitions in the same or similar manner.

The mapping and/or assignment of partitions to computation instances, elements, units, or other cloud resources can be accomplished in any suitable manner. For example, any realistic number of few partitions or groups of partitions can be mapped and/or assigned to any realistic number of cloud resources, as desired by the user. And the cloud resources can be present in any number of cloud environments. Still further, these mapping permutations can be stored for future reference.

As shown in FIG. 1, use by SaaS users 26, 27, and 28 of SaaS 1 and cloud resources 21, 22, and 23 is monitored by metering system 25. Metering system 25 sends notices, alerts, bills, and/or other use-based information to each of SaaS users 26, 27, and/or 28, or the group of SaaS users, or any grouping of SaaS users, based on their actual use of SaaS 1 and/or the resources of cloud 111. This is quite different from existing systems in which SaaS services use block billing.

It is contemplated by the current inventors that the metering system 25 is capable of monitoring the use of any realistic number of SaaS applications by any realistic number of users across any realistic number of cloud environments, desired by a user.

Examples of a user's use of software application and cloud resources can include, among other things, use of billable resources such as compute, storage, power, processor time network resources, and other physical resources of the cloud. Additionally or alternatively, billable resources can include the run time of the software application, the data streams coming from applications, the number of users, the number of concurrent users and access of those users, the features of software applications that are accessed by the user or users, the user or users access to databases, the file system utilized, messaging and associated resources utilized by the software application, and other SaaS characteristics.

Use of software applications and cloud resources can be monitored by any suitable means. For example, a tenant identity manager and an application identity manager, or combination of the two, can be used to resolve, distinguish, separate, and/or otherwise monitor the data streams coming from one or multiple SaaS applications and from one or multiple tenants. The monitored data streams may be quantized based on rules.

The quantized data can be used to generate notices and/or reports for an administrator of the metering system and/or the user or users of the SaaS applications. Such notices and/or reports can be presented in charts, tables, printed format, dynamic or static GUIs, letters, memos, invoices, display notes, chimes, display pop-ups, email, audio message, or any other suitable fashion, and can be delivered to an administrator and/or user of SaaS applications via hard copy, text message, email, phone call, instant message, letter, or by any other suitable means.

Figure 2:
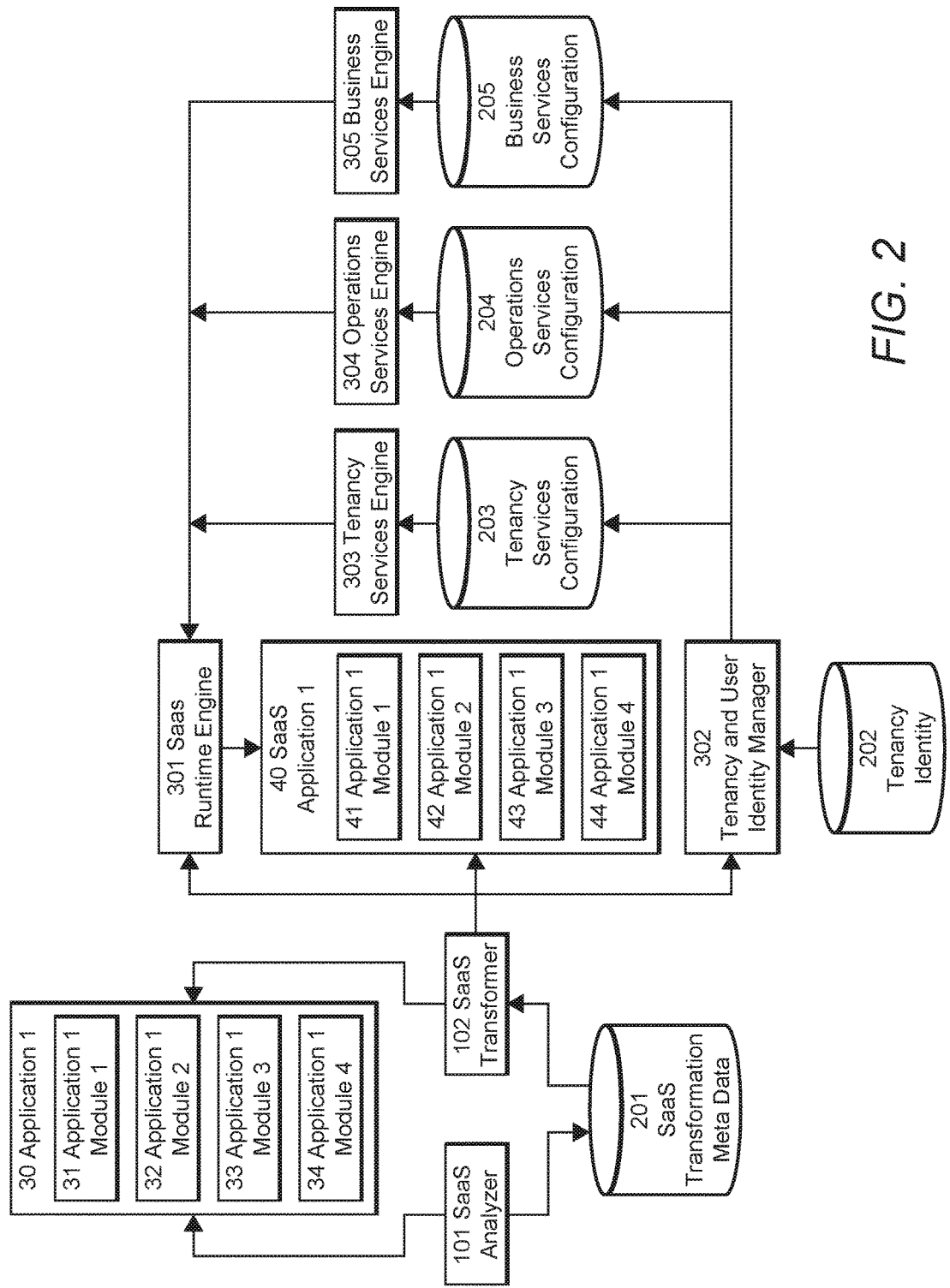
FIG. 2 is a schematic of an application being transformed to a SaaS.

FIG. 2 shows an exemplary multi-tenant system that transforms a normal non-tenant aware application into a multi-tenant application system. The original non-SaaS application 30 consists of multiple modules 31, 32, 33 and 34. The SaaS analyzer 101, scans the application to collect data on what aspects of the applications needs to be marked for transformation so that the application can run as SaaS. The information collected by SaaS analyzer is stored in the database 201.

SaaS Analyzer 101 analyzes the application 30 runtime software artifacts (RSA), which could be, for example an intermediate binary code for virtual machine based languages which are compiled or text based source code for interpreted languages, to determine possible interceptions for transformation. SaaS analyzer 101 can identify whether signatures exist for the known external call library 1020. The interceptions thus found are stored inside the SaaS transformation metadata database 201. SaaS transformation metadata database holds a library of non-SaaS application intercepts that could be transformed into SaaS intercepts to utilize one of the SaaS services, such as tenancy services engine 303, operations services engine 304, and business services engine 305.

SaaS analyzer 101 can create interceptions handled by an interception pattern handler (not shown) as true multi tenancy (TMT) interceptions or virtual tenancy (VT) interceptions. Application 30 can require more than one machine to run, and its RSA would include RSA of each runtime machine. If all the interceptions found inside all the RSA of a given machine is determined to be TMT interceptions, then that machine can be shared across multiple tenants. If that interception is determined by the system to be a VT interception, then, in some embodiments, that whole machine, which contains that interception, has to be replicated for each tenant in the SaaS Runtime engine 301 environment. Such a setup would be called a machine level VT. For some interceptions, process level VT interceptions could be implemented, where a few new processes would be created for each tenant, instead of needing an entire new machine for each tenant. A process level VT is less optimal than TMT, but better, in terms of running cost, than a machine level VT. SaaS analyzer 101 determines whether to create a TMT infrastructure (using one machine across multiple tenants), a machine level VT infrastructure (using several machines, one for each tenant), or a process level VT infrastructure (using a single machine having several processes, each process created for a separate tenant), in accordance with administrative settings from the admin user. For example, an admin user could set SaaS analyzer 101 to create a TMT infrastructure when it detects a TMT interception, a process level VT infrastructure when it detects a VT interception and less than a threshold level (e.g. 20%) of average CPU utilization, and a machine level VT infrastructure when it detects a VT interception and at least a threshold level of average CPU utilization.

A Guided Approach available, also called as GA, could be a setting for the SaaS analyzer 101 that allows an administrative user to manually select the types of VT infrastructure the SaaS analyzer 101 will use, which allows the application owner to do extra development to convert manually that interception under question. Since TMT allows sharing of runtime machines or processes, using a TMT infrastructure (when available) it reduces the overall cloud cost for managing given number of tenants.

Pre built tenancy service engine 303 provides tenancy management services such as, creation, retrieval, update and deletion of tenants. Providing such services to tenant-aware application 40 allows the system to manage tenants in the system. Tenancy service engine 303 communicates closely with the SaaS runtime engine 301.

SaaS transformer 102, based on the information from 201, adds tags, agents and API calls to tenancy, operations and business services to the application 30 and creates a new copy of the non-tenant-aware application, which is created as SaaS application 40. SaaS transformer also creates links from the transformed application 40 to the runtime SaaS engine 301.

The SaaS runtime engine 301 connects with the three service engines 303, 304 and 305 which deliver tenancy, operations and business services, respectively, to the SaaS application 40. Each of the service engines deliver their corresponding services based on the configuration set in the configuration database 203, 204 and 205 for tenancy, operations and business services respectively.

During the process of transformation, SaaS transformer 102 couples tenancy and user identity manager 302 to the application, which maintains tenancy identity of the SaaS application in the database 202. As instances of SaaS application 40 are created, such as instance 41, instance 42, instance 43, or instance 44, tenancy and user identity manager 302 maintains the tenancy identity of each instance, ensuring that each instance is dedicated towards a separate tenant. The application 40 represents the transformed application delivering the three fundamental capabilities for SaaS, tenancy management, operations and business services.

Figure 3:
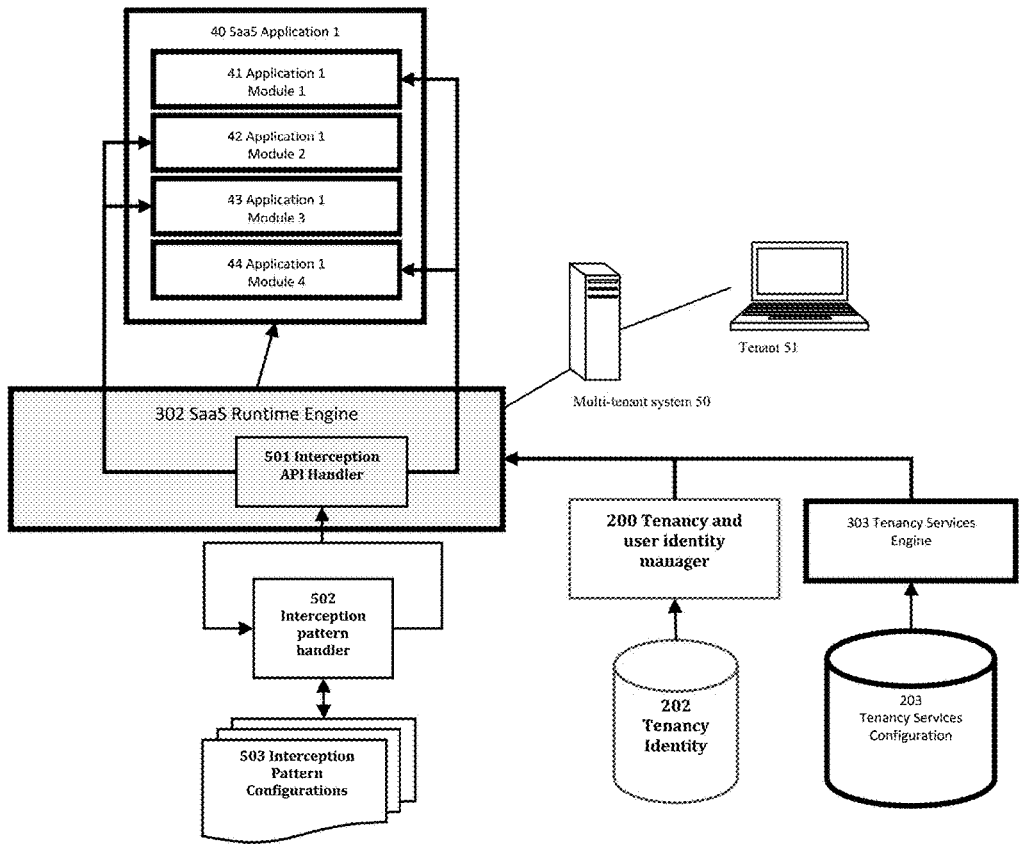
FIG. 3 is a schematic showing how a non-multi-tenant application can be made to handle multi-tenancy using a SaaS runtime engine.

FIG. 3 shows the software architecture of newly transformed multi-tenant application 40 as executed on a multi-tenant system. Module 302 is the SaaS runtime engine, which has been integrated with the application 40 to deliver the application as SaaS to tenant 51 in the multi-tenant system 50. The SaaS runtime engine comprises of interception API handler 501, which module is interfaced to the application 40 and connected to the different modules, interfaces and frameworks within the application.

An interception is considered to be a code segment added to the application where the flow of information by a message can be directed to a different handler, which adds additional information to the message. The interception API handler 502 is connected to the interception pattern handler 502, which in turn accesses the interception pattern configurations and appropriately handles the message calls emanating from interception API call handler. For example, where an non-tenant application had a tenancy service added to create SaaS application 40, when SaaS runtime engine 301 wishes to call the tenancy service, SaaS runtime engine 301 would throw an interrupt by interception API handler 501, which would be recognized by interception pattern handler 502, which would then trigger the appropriate tenancy service by a configuration dictated by one of interception pattern configurations 503, and tenancy service engine 303 would then provide that tenancy service to SaaS application 40.

The runtime engine 301 interfaces with tenancy and user identity manager 200, which looks up the tenancy identity of the tenant in tenancy identity database 202. Tenancy and user identity manager 200 provides the tenant identity to interception API handler to ensure that the tenancy service provided by tenancy services engine 303 is provided to the correct tenant.

Just as tenancy identity database 202 provides a log of tenant identities that could be used by the system to provide tenancy information to tenancy and user identity manager 200, tenancy services configuration database 203 could provide a configuration for tenancy services required for a specific application, such as SaaS application 40, and the tenancy services engine 303 delivers the services to the SaaS runtime engine 301 based on the configuration for SaaS application 40.

Tenancy and user identity manager 302 could search tenancy identity database 202, to determine the tenancy of the user who is using the web browser to access a tenant-aware application URL (typically used over the internet to access tenant-aware SaaS applications). This tenancy identity is stored and transmitted to the interception API handlers and interception pattern handlers 502 (See FIGS. 5a-5c) to ensure proper tenant-aware application access experience to the user.

Figure 4:
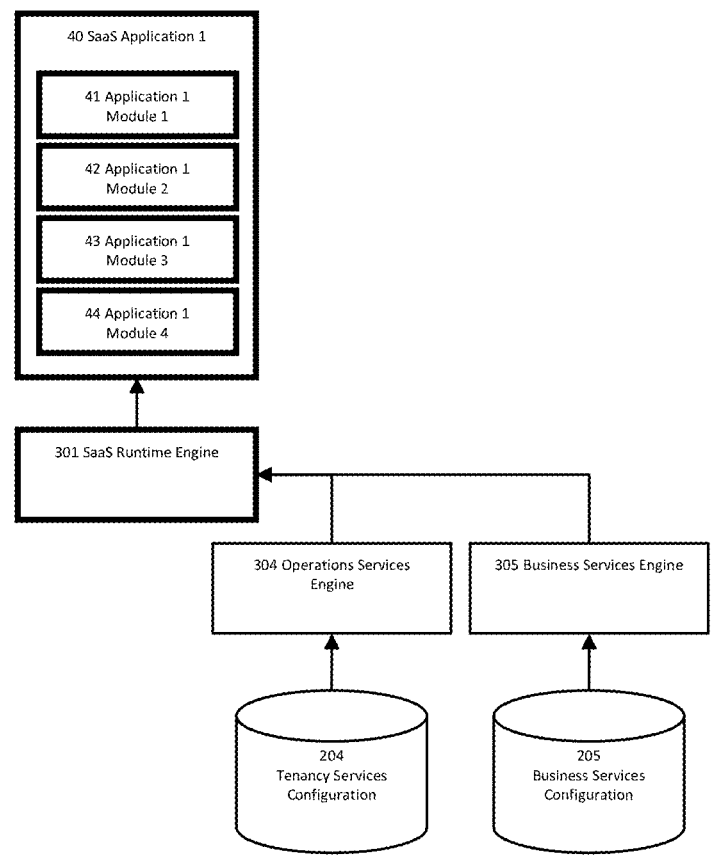
FIG. 4 is a schematic describing the addition of operation and business service components to an application to deliver it as a SaaS.

FIG. 4 shows a software architecture of newly transformed multi-tenant application 40 as executed on another embodiment of a multi-tenant system. Engine 301 is the SaaS runtime engine that is interfaced with the SaaS application 40. Configuration parameters for SaaS application 40 are stored by the multi-tenant system in two different databases, tenancy services configuration database 204 and business services configuration database 205, to handle tenancy and business services, respectively.

Operations services engine 304 and business services engine 305 are operations and business services engines, respectively, that deliver the named services to the SaaS application 40 through SaaS runtime engine 301. The operations services engine 304 and business services engine 305 deliver the services as described by the tenancy services configuration database 204 and business services configuration database 205.

FIGS. 5a, 5b, and 5c illustrate the various stages of an application before it has been transformed from a non-tenant-aware application to a multi-tenant SaaS application, after the application has been transformed into a SaaS application an installed within the SaaS environment, and after the application has been transformed into a SaaS and installed outside of a SaaS environment.

The purpose of transformation by SaaS transformer 102 is to redirect the existing non-tenant aware application 30 calls to single-tenant external system 1010, to a multi-tenant external system 1015. One part of the transformation is to transform the external system 1010 into a transformed multi-tenant external system 1015, and another part of the transformation is to transform the application 30 into transformed SaaS application 40.

In FIG. 5a, before the system and application are transformed into a multi-tenant system and a multi-tenant SaaS application, respectively, the application 30 usually calls, from its call site 1030, the external non-tenant aware system 1010 through an external call library 1020, after consulting some kind of stored call configurations 1040. For example, a single-user installation of Windows® might have a single-tenant application that sends external calls to the operating system. Call site 1030 checks the call configuration 1032 by accessing stored call configurations 1040, and then initiates the external call 1034 via external call library 1020. External call library 1020 then executes an external call 1022 upon external system 1010.

In FIG. 5b, after the external single-tenant external system 1010 has been transformed into the external multi-tenant external system 1015, the transformed SaaS application 40 is functionally coupled to the transformed multi-tenant external system 1015. Like before, call site 1030 checks the call configuration 1040 by accessing stored call configurations 1040, and initiates the external call 1034. SaaS transformer 102 injects interception pattern handler 502, which could be carefully crafted code, between call site 1030 and external call library 1020. Since interception pattern handler 502 has been installed in SaaS application, interception pattern handler 502 catches any initiated external calls 1034 from call site 1030, determines whether the initiated external call 1034 is a call that uses normal external system calls or the updated tenancy services, operations services, and/or business services, and routes the external call accordingly.

Interception pattern handler 502 does this by consulting interception pattern configuration 503, which is a translation library created by SaaS transformer 102 which lists what external calls use the normal, single-tenant external system calls, and what external calls use the updated services calls (tenancy services, operations services, and/or business services). Interception pattern configuration 503 reacts properly even if there are runtime modifications to call redirection due to addition and deletion of tenants, by further checking with interception API handler 501 inside the SaaS runtime engine 301. Any external calls that utilize the updated services calls could be sent to SaaS runtime engine 301 to call any one of cloud services 11001 and serve one or more of them to SaaS application 40. Any external calls to the local multi-tenant external system 1015 are sent to external call library 1020, which then initiates external call 1022 to the transformed multi-tenant external system 1015.

In FIG. 5b. The SaaS runtime engine installed in transformed multi-tenant external system 1015, in consultation with interception pattern configuration 503 for the transformed SaaS application requirements, and the runtime tenancy services engine 303 demands, orchestrates cloud services 11001, to create, destroy or modify cloud instances optimally.

In FIG. 5c, SaaS Application 40 is installed outside a SaaS environment, functionally coupled to a single-tenant external system 1010. Such an environment is typically in the application 30 owner's developer environment. In this situation, external system 1010 is not transformed into a multi-tenant system. SaaS transformer 102 still injects interception pattern handler 502 into SaaS application 40 to make SaaS application 40 tenant-aware. This time, however, interception pattern handler 502 analyzes mock interception pattern configuration 510, which accepts any initiated external call 1034, without passing the external call to an interception API handler or a SaaS runtime engine. This way, a developer could develop and test SaaS application 40 within a single-tenant system before installing the SaaS application 40 into a multi-tenant external system.

Since interception pattern handler 502 is not dependent on the actual tenants, but rather responds to intercept triggers, without any further changes the transformed SaaS application 40, works with the SaaS runtime engine 301 embedded in transformed multi-tenant external system 1015 to respond appropriately to runtime tenant changes. The transformed SaaS application 40 can thus exhibit multi tenancy in any environment that has a suitably configured SaaS runtime engine 301.

SaaS transformer 102 transforms the application 30 by modifying the runtime software artifacts (RSA) like intermediate binaries or text sources as appropriate, based on the recommendations of SaaS analyzer 101 as stored inside SaaS transformation metadata database 201, and stores the resulting runtime information in interception pattern configuration 503.

FIG. 6 shows an exemplary operations service engine having a resource selection service 1100, resource configuration manager 1110, configuration definition 1120, and resource handler 1130. An operations services engine could be configured to manage and deliver any of the following operational support service (OSS): monitoring services, incident, problem and change management services, metering services, provisioning services, capacity management and auto scaling services, service level agreement management services, and backup and restore services. The resource selection service could provide a selection user interface to an administrative user to allow the user to select operations services to add to the multi-tenant application. Once one or more services are selected, the selected services could be added to the multi-tenant application by the SaaS transformer, and the resource configuration manager could then manage one or more of these services in accordance with one or more configuration definitions provided by the administrative user. Intercepts thrown by the multi-tenant application used by one of the operations services could be handled by resource handler 1130, which could, for example, auto-scale multi-tenant processes to a second server if CPU utilization rises too high.

A similar architecture could be used for a business service engine. Business services engine could manage and deliver any of the following business support services (BSS): service management, pricing and rating management, order management, user and role management, accounting billing and invoice management, contracts management, sla reporting, reporting and analytics, and alert and notification.

What is claimed is:

1. A SaaS (Software as a Service) system for transforming software applications, comprising a non-transitory computer-readable medium storing instructions that, when executed by a computer processor, cause the computer processor to perform the steps of:

identifying non-SaaS application intercepts of a non-SaaS application capable of being transformed into SaaS intercepts by locating non-SaaS application intercepts within a SaaS transformation database containing transformable non-SaaS application intercepts;

transforming a portion of the non-SaaS application intercepts into SaaS intercepts by:

(a) adding, to the non-SaaS application, API (Application Program Interface) calls to tenancy services to generate a transformed SaaS application linked to a tenancy and user identity manager via the added API calls to tenancy services, wherein the added API calls to tenancy services comprise SaaS intercepts from the SaaS transformation database, and (b) installing an interception pattern handler functionally connected to the generated transformed SaaS application, wherein the interception pattern handler is configured to:

(1) catch calls initiated from a call site, (2) determine whether a caught call is a non-SaaS application intercept, or a SaaS application intercept, and (3) route SaaS application intercepts to a SaaS runtime engine and non-SaaS application intercepts to an external system;

determining a tenancy identity associated with an instance of the transformed SaaS application, wherein each instance is dedicated towards a separate tenant identified by the tenancy identity; and triggering at least one SaaS service associated with the tenancy identity when the instance of the transformed SaaS application triggers at least one of the SaaS intercepts from the SaaS transformation database.

2. The SaaS system of claim 1 wherein the at least one SaaS service comprises a cloud environment service.

3. The SaaS system of claim 1 wherein the at least one service is selected from the group consisting of a tenancy service, an operations service, and a business service.

4. The SaaS system of claim 1 wherein the step of transforming the portion of the non-SaaS application intercepts into SaaS intercepts adds a SaaS intercept to the transformed SaaS application for each identified non-SaaS application intercept.

5. The SaaS system of claim 1, wherein the interception pattern handler routes SaaS application intercepts to the runtime engine by utilizing an interception API handler.

6. The SaaS system of claim 1, wherein the non-transitory computer-readable medium further stores instructions that, when executed by the computer processor, cause the computer processor to track a tenancy identity of an application instance using a user identity manager.

7. The SaaS system of claim 6, wherein the tenancy and the user identity manager provide the tenancy identity to a tenancy services engine to trigger the at least one SaaS service as a function of the tenancy identity.

* * * * *